Feb. 28, 1967    D. E. DUNSTER ETAL    3,307,145
METHOD AND APPARATUS FOR COMPILING, COMPOSITING, CORRELATING
AND NORMALIZING SEISMOGRAPHIC DATA
Filed Nov. 20, 1963    4 Sheets-Sheet 1

INVENTORS
DONALD E. DUNSTER &
DOUGLAS S. SULLIVAN
BY
William J. Miller
ATTORNEY 3,307,145
METHOD AND APPARATUS FOR COMPILING, COMPOSITING, CORRELATING AND NORMALIZING SEISMOGRAPHIC DATA
Donald E. Dunster and Douglas S. Sullivan, Ponca City, Okla., assignors to Continental Oil Company, Ponca City, Okla., a corporation of Delaware
Filed Nov. 20, 1963, Ser. No. 324,968
31 Claims. (Cl. 340—15.5)

The present invention relates generally to the art of signal analysis and more particularly, but not by way of limitation, relates to a method and apparatus for compositing a plurality of seismographic signals to reduce random noise and surface interference, for normalizing the composited signals to minimize the adverse effects of distortions due to attenuation of portions of the frequency spectrum of the seismic signals, and for correlating the seismic signals with the transmitted signal in order to determine the depth of reflecting subsurface interfaces.

In geophysical prospecting, a seismic signal is generated at or near the surface of the earth such that a seismic disturbance or wave front propagates in all directions from the point of generation. A portion of the seismic energy travels primarily in the surface layers of the earth and arrives in a relatively short time at geophones connected to the surface of the earth at distant points. The seismic energy also propagates downwardly and as it passes through various surfaces of discontinuity or interfaces, a portion of the energy is reflected back to the surface and is recorded by the geophones at a later time, depending of course upon the length of the path followed by the particular seismic energy. The period of time required for the seismic signal to travel downwardly and be reflected back to the surface then provides valuable information concerning the depth and the position of the interfaces between the sedimentary strata of the earth.

For many years a seismic signal was generated by an explosion blast which of course produced substantially instantaneous high peak energy but which also produced a large amount of undesirable random noise. However, in more recent times improved methods of geophysical surveying have been developed which utilize a seismic signal of relatively low energy level but having a non-repetitive, controlled frequency content and a relatively long duration. An example of the latter type of seismic signal and the seismographic methods using the same are described in U.S. Patent No. 2,688,124, issued to Doty et al. on August 31, 1954, and assigned to the assignee of the present invention. Although the present invention may be utilized in analyzing data created by other types of seismic signals, it is particularly related to and adapted for use in connection with the methods described in the above referenced patent application.

The seismic signal used in the method described in the referenced patent is conveniently generated by one or more hydraulically powered transducers and persists for several seconds over which period of time the signal varies uniformly between a low frequency on the order of 10 c.p.s. and a high frequency on the order of 100 c.p.s. In practice, a typical seismic signal may vary uniformly between the low frequency and the high frequency, in which case it is referred to by workers in the art as an "upsweep," or may change from the higher frequency to the lower, in which case it is referred to as a "downsweep." In either case, the frequency content and phase of the sweep signal is precisely controlled by appropriate phase control circuitry which governs the operation of the hydraulically powered transducers.

In order to obtain the seismographic data which is to be processed by the apparatus constructed in accordance with the present invention, a plurality, usually ten, of separate nests of geophones are located in a straight line at ten spaced points on the surface of the earth. The nests of geophones may then be connected in the conventional manner to a recorder located in a control van positioned nearby. The recorder will usually be of the type described in U.S. Patent No. 3,065,453, issued to W. E. N. Doty on November 20, 1962, and assigned to the assignee of the present invention. One or more hydraulically powered transducers are carried by trucks and are positioned at a point somewhat remote from the geophones and generally on the line extending through the spaced nests of geophones. A control sweep signal is then transmitted from the recording van to the transducer trucks and the transducers are operated in response to and in synchronism with the control signal. The seismic signal generated by the transducer then propagates downwardly and is reflected by each interface and returns to each of the ten separate nests of geophones. The seismic signal detected by each nest of geophones is recorded by one of ten recording heads on a separate record track of a single record sheet attached to a common drum, so that the ten signals from the ten nests of geophones are recorded on ten separate magnetic tracks disposed in side-by-side relationship on the record sheet. After the seismic signal has subsided, the ten recording heads of the recording device are indexed to an adjacent position on the record sheet so as to record ten additional magnetic tracks, each of the ten being in close side-by-side relationship to the magnetic track previously laid down by the corresponding recording head. The transducers are moved along the line extending through the nests of geophones to a new point and the same control sweep signal is again transmitted by radio to the transducers which respond by generating a second seismic signal having the same controlled frequency content. The seismic sweep signal again propagates downwardly and is reflected upwardly to the nests of geophones and recorded as ten separate magnetic tracks on the record sheet with the signal from each nest of geophones recorded immediately adjacent to the signal previously detected by the same nest of geophones. This procedure may be repeated a plurality of times at different points so that a corresponding number of seismic signals from each of the nests of geophones will be magnetically recorded in side-by-side relationship on the record sheet. In the practice adopted by the inventor and his associates, the transducer is operated forty times and each of the forty transmissions is detected by ten nests of geophones so that four hundred separate seismic signals are recorded on the same record sheet in a pattern which will facilitate the compositing step, as will hereafter be described in greater detail.

When each of the long duration seismic sweep signals is transmitted, the entire sweep signal will be reflected at each subsurface interface. Since the total time required for the signal to travel downwardly to even the deeper interfaces and return to the surface will normally be less than the time duration of the sweep signal itself, the various reflections from the subsurface interfaces will not be separated in time, but rather will overlap such that the seismic signal detected by the various nests of geophones will be very complex and will not then reveal the desired information regarding the travel times of the signals to and from the various interfaces. However, by correlating the received complex signal with the sweep signal originally generated in the earth, the precise time required for each of the reflected sweep signals to travel down to the various interfaces and return can be determined with considerable accuracy.

The accuracy of the correlation process is dependent to a large degree upon the frequency band of the sweep signal which is originally induced in the earth and ultimately returned to the surface. The correlation procedure entails the determination of the degree of coherence between the reference sweep signal and a corresponding time length of the complex received signal as the reference sweep signal is translated over the length of the complex signal. Each time that the degree of coherence reaches a maximum, or in other words each time that the sweep signal substantially coincides with a corresponding length of the complex signal, a sharp indication will result on the correlation trace which will indicate the arrival time of a reflection from a subterranean interface and is therefore referred to as a seismic event. Theoretically, if the frequency band of the reference signal is infinite, the indication of the seismic event would be a very sharp spike and would give an ideal measure of the precise arrival time. On the other hand, as the frequency band of the reference signal decreases the seismic event indication on the correlation signal becomes less sharp and each seismic event tends to stretch over a greater time period. As a result, seismic events close in time tend to interfere and overlap and frequently become indistinguishable.

It has been found that a seismic signal having a frequency band of several octaves in the spectrum from 15–90 c.p.s. is practical and will produce useful correlation data. However, the correlation procedure presumes that the amplitude throughout the frequency spectrum of both the reference sweep signal and the recorded seismic signal is substantially constant. In practice this sometimes presents a problem because the earth tends to attenuate the higher frequency portions of the spectrum more than the lower portions. Further, due to the relative spacing and thickness of the various subterranean interfaces, portions of the seismic sweep signal will be either attenuated or reinforced so that the amplitude of the reflected seismic sweep signals returning to the surface of the earth will frequently be distorted. Efforts have been made heretofore, and have been partially successful, in varying the amplitude of the signal originally induced in the earth in order to compensate for the earth's tendency to attenuate the higher frequencies. However, since the degree of cancellation and reinforcing, and indeed the degree of attenuation, will vary from one locality to the next, the degree of amplitude distortion cannot be predicted in advance with any appreciable degree of certainty. When one portion of the signal is attenuated, such as the upper half of the spectrum from 50–90 c.p.s for example, the effect will be as if the total frequency spectrum were narrowed and the resulting indications or seismic events will tend to grow in time length and events close in time will interfere. This attenuation, cancellation and reinforcement of various segments of the frequency spectrum can be corrected by a process referred to by workers in the art as "normalizing." In this "normalizing" procedure, the correlated signal is filtered or broken into several separate frequency bands and the amplitude of each of the separate frequency bands is adjusted to a desired level in order to restore the distorted portions of the sweep signal to the constant level. This process simulates the effect which would be obtained if the amplitude of each returning seismic sweep signal reflection had a constant amplitude over its entire frequency spectrum.

The present invention contemplates a novel apparatus for compositing, normalizing and correlating a plurality of sequentially produced seismic signals. Without intending to limit the scope of the invention as defined by the appended claims, the apparatus may be summarily described as comprising three separate cylindrical recording surfaces keyed to and rotated by a common shaft. A plurality of the complex seismic signals to be composited, correlated and normalized are recorded in side-by-side relationship upon one of the surfaces. The several signals are composited by simultaneously reproducing and additively mixing the signals to produce a single composited signal which is simultaneously recorded upon the second of the recording surfaces. As the second recording surface continues to rotate, a correlation head produces a plurality of correlation signals each representative of a particular frequency band of the sweep signal so that the amplitude of each of the correlation signals may be individually adjusted. The adjusted correlation signals are then mixed and recorded upon the third recording surface. Means are also provided for preserving and transmitting the starting point or zero time of the seismic transmission on the third recording surface, as well as means for preserving a constant frequency timing signal so as to provide a means for measuring the time required for the seismic signal to travel to and return from subterranean strata.

In accordance with the method of the present invention, seismic data is compiled and processed by recording a reference signal on a first record sheet. An elapsed time signal may also be recorded on the first record sheet simultaneously with the reference signal. The reference signal is then reproduced and a seismic signal simultaneously induced in the earth corresponding to the reference signal, and the seismic reflection signal is detected and simultaneously recorded on the first record sheet. The first record sheet is then moved in synchronism with second and third records sheets and maintained in predetermined relationship.

Of course the three record sheets may actually be one physical record means. As the record sheets are moved, the seismic reflection signal is reproduced from the first record sheet, recorded on the second record sheet, correlated from the second record sheet by a correlation head to produce a correlation signal, and the correlation signal recorded on the third record sheet. The reference signal is also reproduced from the first record sheet and recorded on the second record sheet, correlated from the second record sheet by a second correlation head to produce a zero time correlation signal which is recorded on the third record sheet. The timing signal may also be reproduced from the first record sheet and recorded on the third record sheet. The correlation signal may also be split into a plurality of frequency band components and normalized by adjusting the relative amplitudes of the components prior to recordation upon the third record sheet. Other aspects of the present invention will be more evident from the subsequent detailed description and these aspects will be pointed out with particularity by the appended claims.

Therefore, an object of the present invention is to provide an apparatus for compositing, correlating and normalizing a plurality of sets of complex seismic signals or the like.

Another object of the present invention is to provide a method for compiling, compositing, correlating and normalizing a plurality of sets of complex seismic signals or the like.

Still another object of the present invention is to provide an apparatus of the type described which is free from wow and flutter and other errors which variations in the speeds of the several record media would otherwise cause.

Yet another object of the present invention is to provide an apparatus of the type described for compositing and correlating one or more sets of complex seismic signals.

Another object of the present invention is to provide an apparatus of the type described for correlating and normalizing one or more complex seismic signals.

Still another object of the present invention is to provide an apparatus of the type described for correlating one or more complex seismic signals.

Another object of the present invention is to provide an apparatus of the type described which will instantaneously process a plurality of sequentially recorded seismographic signals quickly, efficiently and with great accuracy.

Still another object of the present invention is to provide an apparatus of the type described which may be economically manufactured and which will have a long and trouble free service life.

Yet another object of the present invention is to provide an apparatus of the type described which does not require any expendable supplies, such as photographic recording media, in its operation and which may therefore be very economically operated.

Many additional objects and advantages of the present invention will be evident to those skilled in the art from the following detailed description and drawings, wherein:

Figure 1:
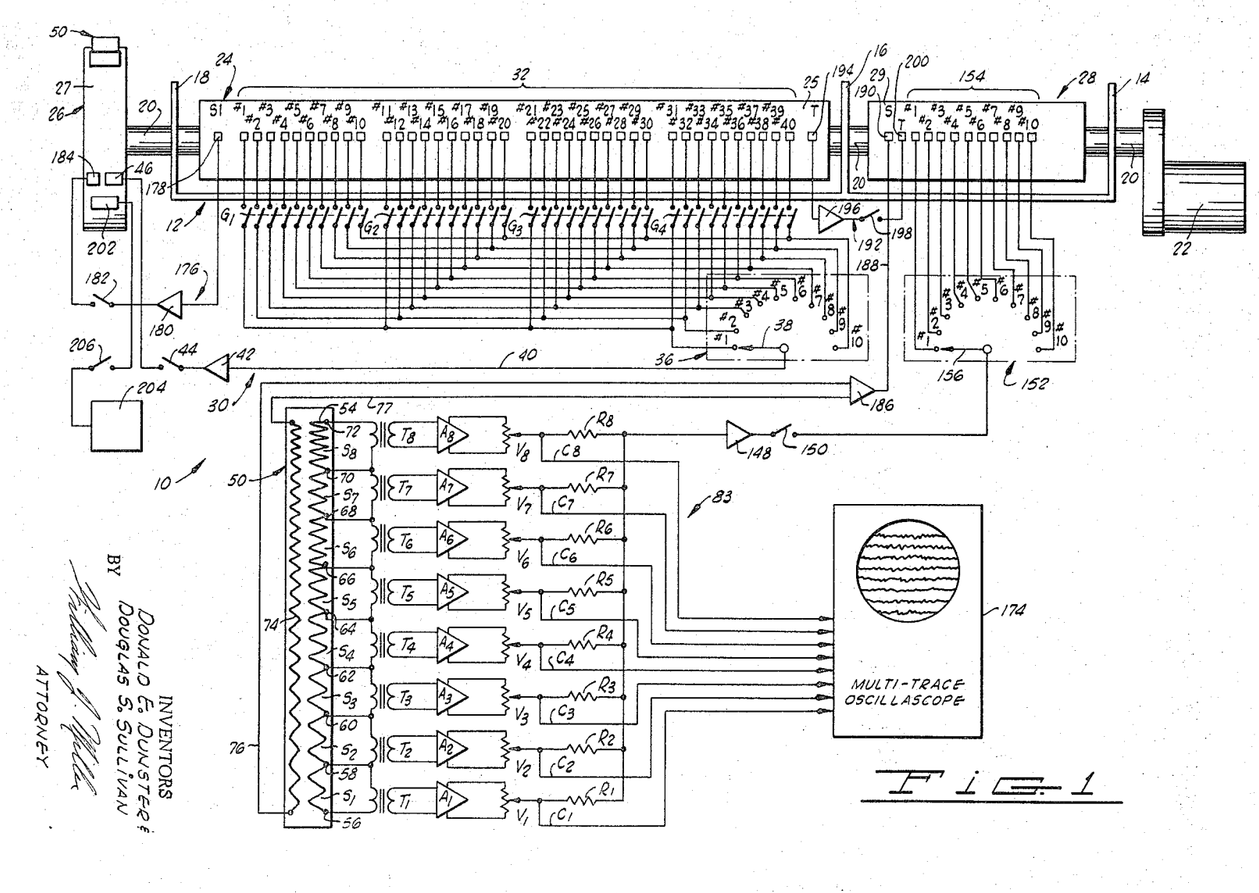
FIG. 1 is a schematic illustration of an apparatus constructed in accordance with the present invention.

Referring now to the drawings, and in particular to FIG. 1, a device constructed in accordance with the present invention is indicated generally by the reference numeral 10. The device 10 is comprised of a suitable support frame indicated generally by the reference numeral 12 which has three journal blocks 14, 16 and 18 through which a drive shaft 20 extends and in which the drive shaft 20 is rotatably journaled. The drive shaft 20 is rotated by a drive means 22 which may be comprised of a suitable electric motor and reduction gear box connected to the support frame 12.

A first cylindrical drum means 24 is fixed on the drive shaft 20 and has means for receiving a magnetic record sheet 25 upon which a plurality of seismic signals are magnetically recorded, as will hereafter be described in greater detail. A second cylindrical drum means 26 is also fixed on the drive shaft 20 and has a cylindrical surface upon which at least two signals can be magnetically recorded, as will hereafter be described in greater detail. A third drum means 28 is fixed on the drive shaft 20 and also has a surface upon which a plurality of signals can be magnetically recorded, as will hereafter be described in greater detail. The surfaces of the drums 26 and 28 may conveniently be comprised of conventional magnetic recording sheets 27 and 29.

A first electrical means, indicated generally by the reference numeral 30, is comprised of forty reproducing heads indicated collectively by the reference numeral 32, and individually designated #1 through #40. The forty reproducing heads 32 are operatively positioned in side-by-side relationship adjacent to the surface of the record sheet 25 disposed on the drum 24. Each of the reproducing heads 32 is sufficiently wide to simultaneously scan ten separate magnetic record tracks, as will hereafter be described in greater detail. The first set of ten reproducing heads #1–#10 are individually connected by the ten switchblades of a gang switch $G_1$ and suitable conductors to the ten contacts #1–#10, respectively, of a selector switch 36 having a single wiper blade 38. Similarly, the next set of ten reproducing heads #11–#20 are individually connected by the ten switchblades of a second gang switch $G_2$ to the ten contacts #1–#10 of the selector switch 36. The next set of ten reproducing heads #21–#30 are similarly connected to the corresponding contacts #1–#10 of the selector switch 36 by the ten switchblades of a third gang switch $G_3$. The last set of ten reproducing heads #31–#40 are also connected to the corresponding ten positions #1–#10 of the selector switch 36 by the ten switchblades of a fourth gang switch $G_4$. The wiper blade 38 of the ten contact selector switch 36 is connected by a conductor 40 to an amplifier 42 and finally by a master switch 44 to a recording head 46 operatively positioned adjacent to the surface 27 of the second recording drum 26.

It will be noted from the above description that any one of the forty reproducing heads 32 may be individually connected to the recording head 46 by closing the respective gang switch $G_1$, $G_2$, $G_3$ or $G_4$ and positioning the wiper blade 38 of the selector switch 36 at the proper one of the ten contacts #1–#10. Or if all four of the gang switches are closed, the selector switch 36 can be used to simultaneously connect the amplifier 42 to the #1, #11, #21 and #31 reproducing heads by moving the wiper blade 38 to contact #1, or to the #2, #12, #22 and #32 reproducing heads by moving the wiper blade 38 to contact #2. Similarly, if the wiper blade 38 is moved to contact #5 of the selector switch 36, the #5, #15, #25 and #35 reproducing heads will be simultaneously connected to the amplifier 42. The reasons for this switching circuitry will become more evident during the description of the operation of the apparatus 10.

Figure 2:
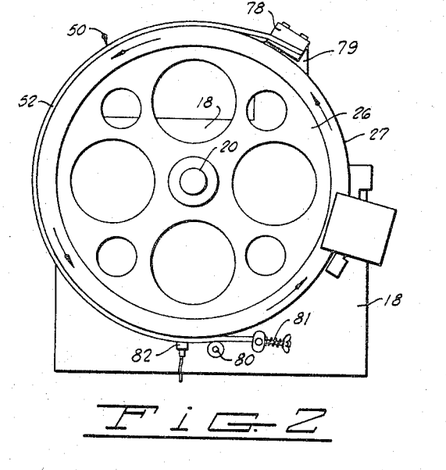
FIG. 2 is an end view, somewhat schematic, of the apparatus which is illustrated schematically in FIG. 1.
Figure 4:
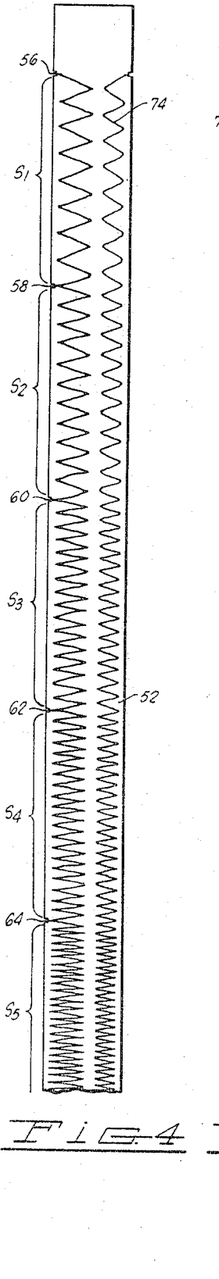
FIG. 4 is a somewhat schematic drawing of one face of a portion of the correlation head of the apparatus of FIG. 1, with the correlation head flattened out rather than wrapped around the drum.
Figure 5:
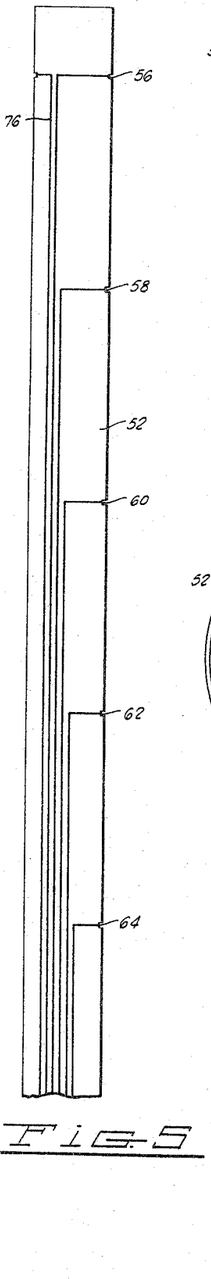
FIG. 5 is a somewhat schematic drawing of the other face of that portion of the correlation head shown in FIG. 4.
Figure 6:
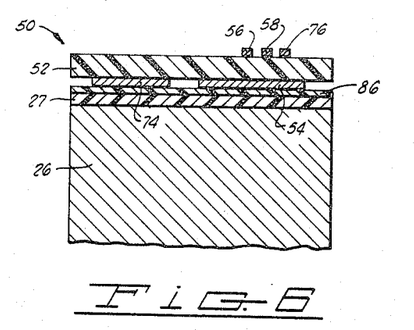
FIG. 6 is a sectional view, taken substantially on lines 6—6 of FIG. 2.

A correlation head means, indicated generally by the reference numeral 50, is operatively positioned adjacent to the surface 27 of the second drum 26, as can best be seen in FIG. 2. The correlation head 50 is comprised of an elongated and flexible printed circuit board 52, a portion of which is illustrated in FIGS. 4 and 5. A first, elongated conductor 54 is formed on the face of the printed circuit board 52 and has a configuration closely approximating the reference sweep signal which is used to control operation of the seismic transducers. Accordingly, the sweep signal has a frequency content and wave shape corresponding to that of the seismic sweep signal originally induced in the earth to produce the seismic traces being processed. The electrical taps 56–72 are spaced at uniform intervals along the length of the conductor 54 so that the conductor 54 will be divided into eight conductor segments $S_1$–$S_8$ between each adjacent pair of taps. A second conductor 74 is disposed on the face of the printed circuit board 52 and has a configuration substantially identical to that of the conductor 54, so as to also approximate the seismic sweep signal which is induced in the earth. However, only the ends of the conductor 74 are electrically connected by the conductor 76, which can be seen in FIGS. 5 and 6, and the conductor 77 to an electrical circuit which will hereafter be described in greater detail.

One end of the correlation head means 50 is held by a suitable bracket 78 which may be connected for support to an extension 79 of the journal support 18. The other end of the flexible printed circuit board 52 is passed between a pin 80, which may be connected to the journal support 18, and the periphery of the drum 26, and is then connected to a device 81 which may conveniently comprise a spring-loaded screw or the like for adjusting the tension in the printed circuit board 52. A thin plastic sheet 86 is provided between the conductors 54 and 74

Therefore, by reference to FIG. 1, it will be seen that the first sets of ten tracks 214, 216 and 218 would lie under the #1, #2 and #3 reproducing heads and the other seven sets would be oriented to pass under the #4–#10 reproducing heads. When the recording head carriage is displaced a full length to the right, it is then oriented so as to lay down ten more sets of tracks, each set having ten tracks, on the record sheet 25 and the ten sets will be positioned under the #11–#20 reproducing heads. After the recording head carriage has been indexed ten times to complete the ten sets of tracks, the carriage is again moved a full length to the right to lay down ten more sets of tracks oriented to pass under the #21–#30 reproducing heads, and finally, the recording head carriage will be displaced a full length to a fourth position to lay down ten more sets of tracks which will be oriented under the ten reproducing heads #31–#40. Thus it will be appreciated that forty separate seismic transmissions or "shots" can be sequentially recorded on the record sheet 25 for each of the ten nests of geophones. In most instances the forty sequentially generated seismic shots will be made at forty different points, usually twenty points on either side of the line of geophones. It will also be noted that the seismic signals detected by the first nest of geophones will be recorded on the sets of tracks positioned under the #1, #11, #21 and #31 reproducing heads. Similarly, the forty separate seismic signals recorded by the second nest of geophones will be recorded in four separate sets of tracks positioned under the #2, #12, #22 and #32 reproducing heads, and the signals detected by the third nest of geophones will pass under the #3, #13, #23 and #33 reproducing heads, and so on, so that if the four gang switches $G_1$, $G_2$, $G_3$ and $G_4$ are closed, each position of the wiper blade 38 of the selector switch 36 will connect the four reproducing heads 32 which overlie the forty record tracks from a single nest of geophones to the amplifier 42 for purposes presently to be described.

In the operation of the apparatus 10, the record sheet 25 is attached to the drum 24 and the similar record sheet 29 is attached to the drum 28. The magnetic surface 27 on the drum 26 may conveniently be fixed in place. The drive motor 22 is started so that the drive shaft 20 and therefore the three drums 24, 26 and 28 will be rotated in the direction of the arrows in FIGS. 1 and 2. Assume that the forty sequentially recorded seismographic signals detected by the first nest of geophones are to be composited, normalized and correlated. The gang switches $G_1$, $G_2$, $G_3$ and $G_4$ should all be closed and the wiper blade 38 of the selector switch 36 moved to contact #1, as illustrated in FIG. 1. The #1, #11, #21 and #31 reproducing heads will then be connected to the amplifier 42. The recording switch 150 should be left open until the correlation signals have been normalized, as will presently be described, and it is desired to record the normalized correlation signal. The correlation control switch 44 should be closed, the zero time control switch 182 and the erase control switch 206 should be closed.

Then as the three drums 24, 26 and 28 are rotated in synchronism, the #1 reproducing head will simultaneously scan all ten of the sequentially recorded tracks underlying that head, the #11 reproducing head will simultaneously scan the ten tracks of the set underlying that head, the #21 reproducing head will scan the ten tracks of the set underlying that head, and the #31 reproducing head will scan then ten tracks of the set underlying that head. The signals generated in the #1, #11, #21 and #31 reproducing heads will be passed through the corresponding switchblades of the gang switches $G_1$, $G_2$, $G_3$ and $G_4$, respectively, to contact #1 of the selector switch 36 and then through the wiper blade 38 to the amplifier 42. Thus it will be appreciated that all forty of the sequentially recorded seismic signals detected by the first nest of geophones and sequentially recorded upon the record sheet 25, as previously described, will be simultaneously reproduced and additively mixed or composited to produce a single seismic signal applied to the amplifier 42. The compositing of the forty separate signals will tend to amplify the true reflections with respect to the random noise because the random noise will tend to cancel while the true seismic signals will tend to reinforce. The compositing step will also substantially reduce the interference generated in the surface layers of the earth if the seismic shots were made at points properly spaced with regard to the geophones in a manner known in the art. In this respect, it is to be understood that the method of compositing seismographic signals per se is well known in the art and does not constitute a part of the present invention.

The composited signal from the #1, #11, #21 and #31 reproducing heads is then amplified by the amplifier 42 and recorded by the recording head 46 on the record track 220 on the surface 27 of the drum 26. As the drum 26 continues to rotate and the composited signal recorded on the track 220 passes under the first correlation head formed by the conductor 54, a correlation signal will be generated in each of the conductor segments $S_1$–$S_8$ in a manner described in copending U.S. patent application Serial No. 325,072, entitled "Magnetic Signal Analyzing Head," filed on even date herewith and assigned to the assignee of the present invention. Each of the conductor segments $S_1$–$S_8$ functions as a frequency band filter and generates a correlation signal having a frequency that lies within the frequency band represented by the respective conductor segment. But more importantly, the amplitude of each correlation signal will be representative of the amplitude of that portion of the seismic signal that lies within the corresponding frequency band of the frequency spectrum.

Figure 7:
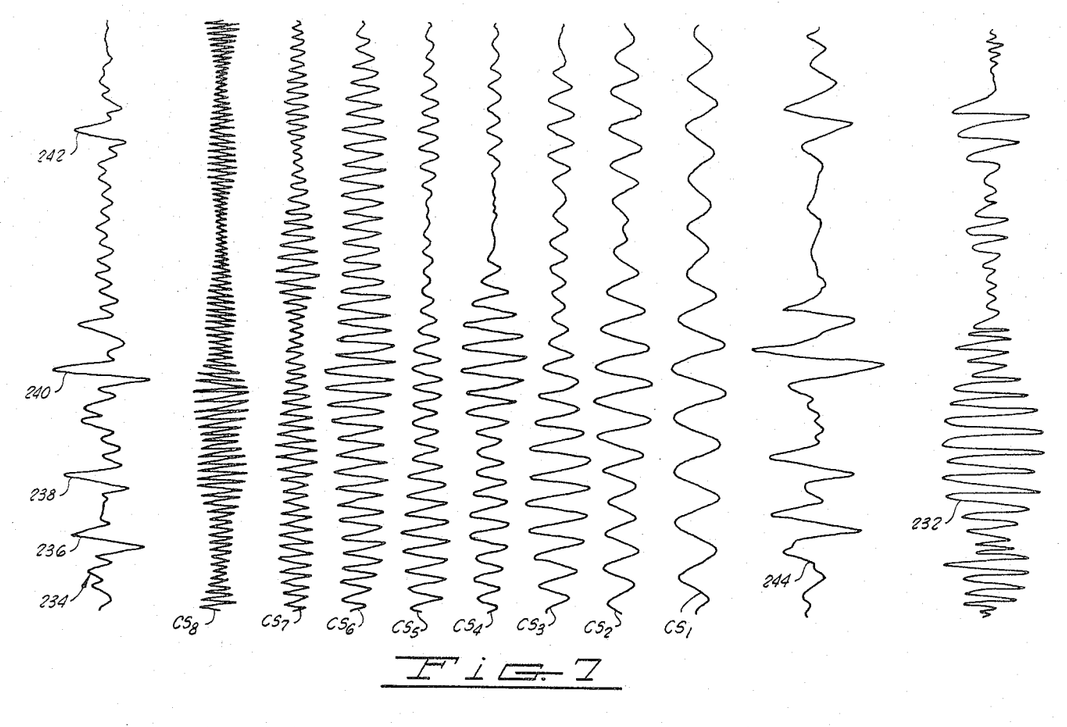
FIG. 7 is a schematic representation of a series of traces oriented on a common time scale and serves to illustrate the operation of the apparatus of FIG. 1.

The correlation signals generated in the conductor segments $S_1$–$S_8$ will be electrically isolated one from the other by the isolation transformers $T_1$–$T_8$, respectively, will be amplified by the amplifiers $A_1$–$A_8$, respectively, and will be passed through the variable resistors $V_1$–$V_8$ and conductors $C_1$–$C_8$, respectively, to the eight channels of the multitrace oscilloscope 174. Assuming, for convenience of illustration, that the composited signal recorded on the record track 230 could be represented by the complex trace 232 of FIG. 7, then correlation signals produced by the conductor segments $S_1$–$S_8$ might appear on the oscilloscope 174 as the traces $CS_1$–$CS_8$, respectively, as illustrated in FIG. 7. The amplitudes of the traces $CS_1$–$CS_8$ represent the energy level or amplitude of the corresponding frequency band in the seismic signal recorded on the track 230 and therefore of the seismic energy returned to the geophones. Therefore, if the upper portion of the frequency spectrum is being attenuated more than the lower frequency portion at the greater depths, it would be expected that the portions of the trace $CS_8$ in the time zones representative of the greater depths would have an amplitude less than the amplitude of the trace $CS_1$ in the corresponding time zones. Further, due to the fact that the spacing and thickness of the subterranean strata of the earth causes random cancellation and reinforcement of various portions of the frequency spectrum, it can be expected that in any particular time zone of interest the amplitudes of the traces $CS_1$–$CS_8$ may not be equal as would be the case if the amplitude of each of the seismic sweep signal reflections had a constant amplitude over its entire spectrum.

Therefore, in order to compensate for amplitude distortion of the frequency spectrum of the complex signal 232, the variable resistors $V_1$–$V_8$ are adjusted until the traces $CS_1$–$CS_8$ are substantially equal in the time zone of interest. During the period of time that this adjustment is being made, the three drums may continue to rotate, in which case the forty seismic signals will repeatedly be composited and recorded on the record track 230 and the eight correlation signal traces $CS_1$–$CS_8$ will be repeatedly displayed on the oscilloscope 174 until the adjustments are completed.

The position of the wiper blade 156 of the selector switch 152 is preferably always placed in the same position as the wiper blade 38 of the selector switch 36 so as to facilitate an orderly and progressive procedure, as will hereafter be described in greater detail. Then when the control switch 150 is closed, the adjusted correlation signals from the variable resistors $V_1$–$V_8$ will pass through the resistors $R_1$–$R_8$, respectively, and will be mixed and applied to the amplifier 148 and finally recorded by the #1 recording head 154 on the record sheet 29 disposed on the drum means 28. Thus it will be appreciated that the forty sequentially produced seismic signals which were detected by the first nest of geophones and sequentially recorded on the record sheet 25 will have been simultaneously reproduced by the #1, #11, #21 and #31 reproducing heads and composited to increase the signal-to-noise ratio, normalized by restoring the portions of the frequency spectrum which have been distorted to a theoretically ideal level, and recorded as a correlation signal on the record sheet 29 under the #1 recording head 154. The composited, normalized and correlated seismic signals may produce a correlation signal having the appearance of the trace 234 of FIG. 7. It will be evident to those skilled in the art that the trace 234 very distinctly reveals seismic events at the points 236, 238, 240 and 242. It will also be evident to those skilled in the art that the trace 234 is a substantial improvement over a trace which has not been normalized, such as might be illustrated by the trace 244 of FIG. 7.

As the drums 24, 26 and 28 are rotated by the drive means 22, the circuit means 176 will also reproduce the reference sweep signal from the record track 212 of the record sheet 25 disposed on the drum 24 and reproduce the reference sweep signal on the record track 220 of the surface 27 of the drum 26. As the record track 220 continues to rotate and passes under the conductor 74 which forms the second correlation head, an auto-correlation signal will be generated in the conductor 74 when the reference sweep signal on the track 220 precisely coincides with the corresponding wave shape of the conductor 74. The auto-correlation signal will be amplified by the amplifier 186 and recorded by the recording head 190 on the record track 222. The auto-correlation pulse generated by precise coincidence of the reference signal on the track 220 and the conductor 74 will be indicative of the zero time or time the seismic transmission was started and provides the reference point from which further time computations can be made. Also, the circuit means 192 will reproduce the constant frequency timing signal from the record track 210 of the record sheet 25 whenever the control switch 198 is closed. Thus by referring to FIG. 3, it will be evident that both the initial or zero time and also the continuous or elapsed time will be very accurately transposed to the new record sheet 29 along with the correlation signal 234.

Figure 3:
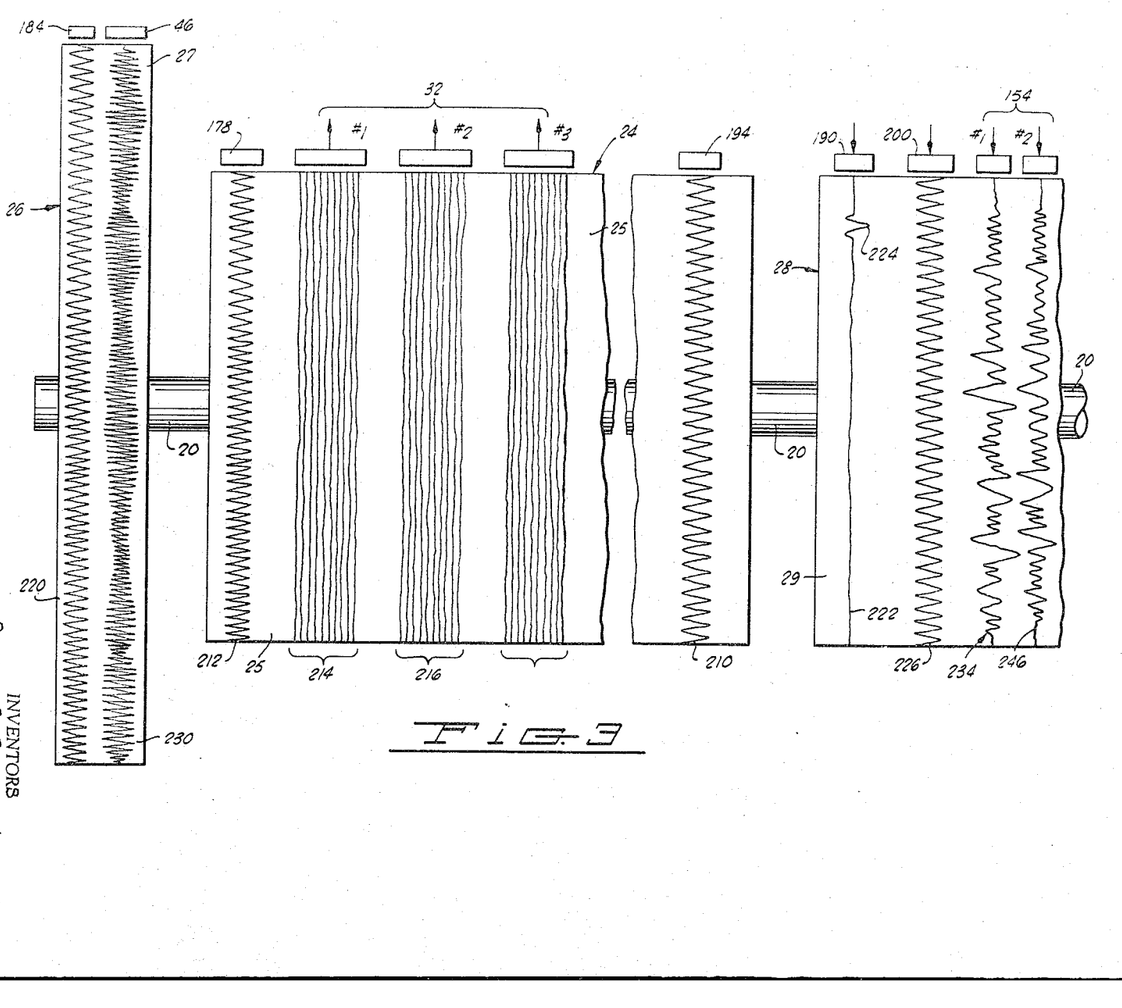
FIG. 3 is a schematic representation of the magnetic tracks recorded on the surfaces of the various drums of the apparatus illustrated in FIG. 1.

As previously mentioned, once the variable resistors $V_1$–$V_8$ have been adjusted to normalize a correlation signal taken from a particular record sheet recorded in a particular locality, it usually will not be necessary to make further adjustments unless another record sheet recorded at a different locality is placed on the drum 24, or it is desired to normalize the correlation signal with respect to another time zone. In fact, it will normally be desirable to correlate the signals from each separate nest of geophones with the same settings of the variable resistors in order to have uniform results. Therefore to proceed with the analyzing operation, the wiper blades 38 and 156 of the selector switches 36 and 152, respectively, are merely moved to the contacts #2. Then with the control switches 44 and 150 closed, the forty sequentially recorded seismic signals disposed under the #2, #12, #22 and #32 reproducing heads will be simultaneously composited and recorded by the recording head 46 on the track 230 on the drum 26. As the composited signal recorded on the track 230 passes under the conductor 54 of the correlating head 50, the eight correlation signals will be generated in the conductor segments $S_1$–$S_8$ and will be passed through the respective isolation transformers $T_1$–$T_8$, the amplifiers $A_1$–$A_8$, the variable resistors $V_1$–$V_8$ and the resistors $R_1$–$R_8$ to the amplifier 148 and finally to the #2 recording head 154 where it will be recorded as the trace 246 as illustrated in FIG. 3. The wiper blades 38 and 156 can then sequentially be moved to the successive corresponding contacts #3, #4, #5, etc., to composite, normalize and correlate the seismic signals from the third, fourth, fifth, etc., nests of geophones, and record them upon the record sheet 29 under the corresponding #3, #4, #5, etc., recording heads 154. It will readily be appreciated that once the variable resistors $V_1$–$V_8$ have been adjusted, the ten correlation signals can be produced and recorded during ten successive revolutions of the three drums 24, 26 and 28. However, it will also be appreciated that there is never any danger of accidentally erasing any of the magnetically recorded traces on the record sheet 25 or of accidentally erasing a correlation signal recorded on the record sheet 29 so long as the selector switches 36 and 152 are operated in synchronism. After the ten correlation signals and the reference and timing signals have been recorded on the record sheet 29, the twelve signals will customarily be simultaneously reproduced by a photographic process upon a long sheet of film for further analysis.

From the foregoing detailed description of a preferred embodiment of the present invention, it will be evident that a highly useful device has been described for simultaneously compositing, correlating and normalizing a plurality of sequentially produced seismic signals. The device, by reason of the novel arrangement of the three drums 24, 26 and 28 upon a common shaft, completely eliminates the possibility that any error can be induced due to changes in speed of the drive means 22 and drive shaft 20, or the possibility that any noise and interference will be introduced by reason of the wow and flutter of gear trains previously employed to synchronously drive record tracks in this type of work. Further, the device provides a means whereby the zero time signal and the elapsed time signal can be very accurately preserved during the time that the seismic signals are being generated and recorded right through the analysis procedure until the processed signals are reproduced as visual traces for further analysis. It will also be evident that a novel installation for a magnetic correlating head has been disclosed wherein the conductor of the correlating head is maintained in a uniformly spaced relationship to an endless record track with reat precision. A novel method for compiling and processing seismic data has also been disclosed by which the zero time and elapsed time can be accurately preserved, and by which the correlation and normalization process may be accurately carried out.

Although a preferred embodiment of the present invention has been described in detail, it is to be understood that various changes, substitutions and alterations can be made therein without departing from the spirit and scope of the invention as defined by the appended claims.

What is claimed is:

1. A device for correlating a first signal having an unknown frequency content with a second signal having a predetermined frequency content, the first signal being recorded on a record sheet adapted to be attached to a drum, the device comprising:

a support frame;
a drive shaft journaled on the support frame;
drive means operatively connected to the drive shaft for driving the drive shaft;

first drum means connected to the drive shaft for receiving the record sheet upon which the first signal is recorded;

second drum means connected to the drive shaft and having a surface upon which a signal can be recorded and having a diameter substantially greater than the diameter of the first drum means for increasing the resolution of the correlation signal;

third drum means connected to the drive shaft and having a surface upon which a signal can be recorded;

first electrical means having a reproducing head operatively positioned adjacent the first drum means and a recording head operatively positioned adjacent the second drum means for reproducing the signal from a record sheet attached to the first drum means and magnetically recording the signal on the surface of the second drum means;

correlation head means consisting of an elongated conductor means having a configuration approximating the wave shape of said second signal, said head means being operatively positioned adjacent to the surface of the second drum means for producing a correlation signal from the signal recorded on the surface of the second drum means; and, second electrical means operatively connected to the correlation head means and having a recording head operatively positioned adjacent to the third drum means for recording the correlation signal on the third drum.

2. A device for correlating a first signal having an unknown frequency content with a second signal having a predetermined frequency content, the first signal being recorded on a record sheet adapted to be attached to a drum, the first signal also being recorded on the record sheet in side-by-side relationship to the first signal as a zero time point, the device comprising the elements defined in claim 1 further characterized by:

third electrical means having a reproducing head operatively positioned adjacent the first drum means and a recording head operatively positioned adjacent the surface of the second drum means for reproducing the second signal from a record sheet positioned on the first drum means and recording the second signal on the surface of the second drum means;

second correlation head means operatively positioned adjacent to the surface of the second drum means for producing a correlation signal from the second signal recorded on the surface of the second drum means; and, fourth electrical means operatively connected to the second correlation head means and having a recording head operatively positioned adjacent to the third drum means for recording the correlation signal from the second correlation head means on the third drum means as a zero time signal.

3. A device for correlating a first signal having an unknown frequency content with a second signal having a predetermined frequency content, the first signal being recorded on a record sheet adapted to be attached to a drum, a constant frequency timing signal also being recorded on the record sheet in side-by-side relationship to the first signal, the device comprising the elements defined in claim 2 further characterized by:

fifth electrical means having a reproducing head operatively positioned adjacent the first drum means and a recording head operatively positioned adjacent to the third drum means for reproducing the constant frequency timing signal from a record sheet attached to the first drum means and recording the timing signal on the surface of the third drum means.

4. A device for sequentially correlating a series of first signals having unknown frequency contents with a second signal having a predetermined frequency content, the first signals being recorded in side-by-side relationship on a record sheet adapted to be attached to a drum, the device comprising:

a support frame;

a drive shaft journaled on the support frame;

drive means operatively connected to the drive shaft for driving the drive shaft;

first drum means connected to the drive shaft for receiving the record sheet upon which the series of first signals are recorded;

second drum means connected to the drive shaft and having a surface upon which a signal can be recorded;

third drum means connected to the drive shaft and having a surface upon which a plurality of signals can be recorded;

first electrical means having a reproducing head operatively positioned adjacent to each of the series of first signals recorded on a record sheet attached to the first drum means, a recording head operatively positioned adjacent to the surface of the second drum means, and circuit means for selectively connecting each of the reproducing heads to the recording head whereby each of the first signals can be selectively recorded on the second drum means;

elongated correlation head means having a pick-up pattern which is a function of said second signal and being operatively positioned adjacent to the surface of the second drum means for producing a correlation signal from the first signal recorded on the surface of the second drum means; and, second electrical means having a plurality of recording heads positioned side-by-side in operative relationship to the surface of the third drum means and circuit means for selectively connecting each of the recording heads to the correlation head means for recording a series of correlation signals produced from a series of first signals in side-by-side relationship on the third drum means.

5. A device for correlating and normaliznig a first signal such as a complex seismographic signal or the like with a second signal of predetermined frequency content, the first signal being recorded on a record sheet adapted to be attached to a drum, the device comprising:

a support frame;

a drive shaft journalled on the support frame;

drive means operatively connected to the drive shaft for driving the shaft;

first drum means connected to the drive shaft for receiving the record sheet upon which the first signal is recorded;

second drum means connected to the drive shaft and having a surface upon which a signal can be recorded;

third drum means connected to the drive shaft and having a surface upon which a signal can be recorded;

first electrical means having a reproducing head operatively positioned adjacent to the first drum means and a recording head operatively positioned adjacent to the surface of the second drum means for reproducing the first signal from a record sheet attached to the first drum means and magnetically recording the first signal on the surface of the second drum means;

correlation head means operatively positioned adjacent to the surface of the second drum means, the head means comprising at least two correlation head segments each for producing a correlation signal representative of the energy level of a predetermined segment of the first signal that is present in the first signal;

second electrical means having a recording head operatively positioned adjacent to the surface of the third drum means for recording a signal thereon and circuit means operatively connected to the recording head and to each of the correlation head segments for separately adjusting the correlation signal from each of the correlation head segments to produce adjusted correlation signals, for mixing the adjusted correlation signals to produce a normalized correlation signal, and for feeding the normalized correlation signal to the recording head for recordation upon the surface of the third drum means.

6. A device for correlating and normalizing a first signal such as a complex seismographic signal or the like with a second signal of predetermined frequency content, the first signal being recorded on a record sheet adapted to be attached to a drum as defined in claim 5 wherein:

the correlation head means is comprised of at least two electrical conductor segments positioned in end-to-end relationship and extending circumferentially around the second drum means, each conductor segment having a configuration approximating the wave shape of a portion of the second signal, and all of the conductor segments taken in conjunction approximating the wave shape of the entire second signal.

7. A device for correlating and normalizing a first signal such as a complex seismographic signal or the like with a second signal of predetermined frequency content, the first signal being recorded on a record sheet adapted to be attached to a drum as defined in claim 6 wherein:

the conductor segments taken in conjunction have a configuration approximating the wave shape of a sweep signal starting at one frequency and progressing to another.

8. A device for correlating and normalizing a first signal such as a complex seismographic signal or the like with a second signal of predetermined frequency content, the first signal being recorded on a record sheet to be attached to a drum as defined in claim 5 wherein:

the second drum means has a diameter substantially greater than the diameter of the first drum means for increasing the resolution of the correlation signals.

9. A device for correlating and normalizing a first signal such as a cmoplex seismographic signal or the like with a second signal of predetermined frequency content, the first signal being recorded on a record sheet adapted to be attachde to a drum as defined in claim 5 wherein:

the correlation head means is comprised of a continuous conductor and the segments are formed by a plurality of electrical tapes connected to midpoints of the continuous conductor; and, the second electrical means is comprised of a plurality of transformers each having a primary winding and a secondary winding, the primary winding of each transformer being connected across two adjacent electrical taps, a variable resistor operatively connected to the secondary winding of each transformer, and summing circuit means operatively connecting all of the variable resistors to the reproducing heads operatively positioned adjacent to the surface of the third drum means for recording the normalized correlation signal on the third drum means.

10. A device for correlating and normalizing a first signal such as a complex seismographic signal or the like with a second signal of predetermined frequency content, the first signal being recorded in side-by-side relationship with the second signal on a record sheet adapted to be attached to a drum, the device comprising the elements as defined in claim 5 further characterized by:

third electrical means having a reproducing head operatively positioned adjacent the first drum means and a recording head operatively positioned adjacent the surface of the second drum means for reproducing the second signal from a record sheet positioned on the first drum means and recording the second signal on the surface of the second drum means;

second correlation head means operatively positioned adjacent to the surface of the second drum means for producing a correlation signal from the second signal recorded on the surface of the second drum means; and, fourth electrical means operatively connected to the second correlation head means and having a recording head operatively positioned adjacent to the third drum means for recording the correlation signal from the second correlation head means on the third drum means as a zero time signal.

11. A device for correlating and normalizing a first signal such as a complex seismographic signal or the like with a second signal of predetermined frequency content, the first signal being recorded in side-by-side relationship with a constant frequency timing signal on a record sheet adapted to be attached to a drum, the device comprising the elements defined in claim 10 further characterized by:

fifth electrical means having a reproducing head operatively positioned adjacent to the first drum means and a recording head operatively positioned adjacent to the third drum means for reproducing the constant frequency timing signal from a record sheet attached to the first drum means and recording the timing signal on the surface of the third drum means.

12. A device for sequentially correlating and normalizing a plurality of first signals such as complex seismographic signals or the like with a second signal of predetermined frequency content, the first signals being recorded in side-by-side relationship on a record sheet adapted to be attached to a drum, the device comprising:

a support frame;

a drive shaft journaled on the support frame;

drive means operatively connected to the drive shaft for driving the drive shaft;

first drum means connected to the drive shaft for receiving the record sheet upon which the series of first signals are recorded;

second drum means connected to the drive shaft and having a surface upon which a signal can be recorded;

third drum means connected to the drive shaft and having a surface upon which a plurality of signals can be recorded;

first electrical means having a reproducing head operatively positioned adjacent to each of the series of first signals recorded on a record sheet attached to the first drum means, a recording head operatively positioned adjacent to the surface of the second drum means, and circuit means for selectively connecting each of the reproducing heads to the recording head whereby each of the first signals can be selectively recorded on the second drum means;

correlation head means operatively positioned adjacent to the surface of the second drum means, the correlation head means comprising at least two correlation head segments each for producing a correlation signal representative of the energy level of a predetermined segment of the first signal that is present in the first signal; and, second electrical means comprising a number of recording heads operatively positioned side-by-side adjacent to the surface of the third drum means, the number of recording heads being equal to the number of reproducing heads positioned adjacent to the first drum means, amplitude adjusting circuit means operatively connected to each of the correlation head segments for adjusting the amplitude of the correlation signal from each head segment to produce adjusted correlation signals, adding circuit means operatively interconnecting the amplitude adjusting circuit means to produce a normalized correlation signal, and switching circuit means for selectively connecting the adding circuit means to each of the recording heads operatively positioned adjacent the surface of the third drum means for recording the normalized correlation signals in side-by-side relationship on the surface of the third drum means.

13. A device for compositing and correlating a set of first signals, such as sequentially produced seismographic signals or the like, recorded in side-by-side relationship upon a record sheet adapted to be attached to a drum with a second signal having a predetermined frequency content, the device comprising:

a support frame;
a drive shaft journaled on the support frame;
drive means operatively connected to the drive shaft for driving the drive shaft;
first drum means connected to the drive shaft for receiving the record sheet upon which the first signals are recorded in side-by-side relationship;
second drum means connected to the drive shaft and having a surface upon which a signal can be recorded;
third drum means connected to the drive shaft and having a surface upon which a signal can be recorded;
first electrical means having a reproducing head operatively positioned adjacent the first drum means and a recording head operatively positioned adjacent to the surface of the second drum means, the reproducing head being sufficiently wide to simultaneously scan all the signals of a set of first signals recorded in side-by-side relationship on a record sheet attached to the first drum means and produce a composite signal, and circuit means interconnecting the reproducing head and recording head for recording the composite signal on the surface of the second drum means;
correlation head means operatively positioned adjacent to the surface of the second drum means for producing a correlation signal from the composite signal recorded on the surface of the second drum means; and,
second electrical means operatively connected to the correlation head means and having a recording head operatively positioned adjacent to the third drum means for recording the correlation signal on the third drum.

14. A device for correlating a first signal having an unknown frequency content with a second signal having a predetermined frequency content, the first signal being recorded on a record sheet adapted to be attached to a drum as defined in claim 13 wherein:

the correlation head means is comprised of an elongated conductor means positioned adjacent to the surface of the second drum means, the conductor having a configuration approximating the wave shape of the second signal.

15. A device for correlating a first signal having an unknown frequency content with a second signal having a predetermined frequency content, the first signal being recorded on a record sheet adapted to be attached to a drum as defined in claim 13 wherein:

the elongated conductor means has a configuration approximating a sweep signal starting at one frequency and progressing to another.

16. A device for correlating a first signal having an unknown frequency content with a second signal having a predetermined frequency content, the first signal being recorded on a record sheet adapted to be attached to a drum as defined in claim 13 wherein:

the second drum means has a diameter substantially greater than the diameter of the first drum means for increasing the resolution of the correlation signal.

17. A device for correlating a first signal having an unknown frequency content with a second signal having a predetermined frequency content, the first signal being recorded on a record sheet adapted to be attached to a drum, the first signal also being recorded on the record sheet in side-by-side relationship to the first signal as a zero time point, the device comprising the elements described in claim 13 further characterized by:

third electrical means having a reproducing head operatively positioned adjacent the first drum means and a recording head operatively positioned adjacent the surface of the second drum means for reproducing the second signal from a record sheet positioned on the first drum means and recording the second signal on the surface of the second drum means;
second correlation head means operatively positioned adjacent to the surface of the second drum means for producing a correlation signal from the second signal recorded on the surface of the second drum means; and,
fourth electrical means operatively connected to the second correlation head means and having a recording head operatively positioned adjacent to the third drum means for recording the correlation signal from the second correlation head means on the third drum means as a zero time signal.

18. A device for correlating a first signal having an unknown frequency content with a second signal having a predetermined frequency content, the first signal being recorded on a record sheet adapted to be attached to a drum, a constant frequency timing signal also being recorded on the record sheet in side-by-side relationship to the first signal, the device comprising the elements defined in claim 17 further characterized by:

fifth electrical means having a reproducing head operatively positioned adjacent to the first drum means and a recording head operatively positioned adjacent to the third drum means for reproducing the constant frequency timing signal from a record sheet attached to the first drum means and recording the timing signal on the surface of the third drum means.

19. A device for compositing and correlating a plurality of sets of first signals, such as sequentially produced seismographic signals or the like, with a second signal having a predetermined frequency content, the sets of first signals being recorded in side-by-side relationship on a record sheet adapted to be attached to a drum and each set comprising a plurality of first signals recorded in side-by-side relationship, the device comprising:

a support frame;
a drive shaft journaled on the support frame;
drive means operatively connected to the drive shaft for driving the drive shaft;
first drum means connected to the drive shaft for receiving the record sheet upon which the first signals are recorded in side-by-side relationship;
second drum means connected to the drive shaft and having a surface upon which a signal can be recorded;
third drum means connected to the drive shaft and having a surface upon which a signal can be recorded;
first electrical means having a plurality of reproducing heads operatively positioned in side-by-side relationship adjacent the first drum means, each reproducing head being sufficiently wide to simultaneously scan a set of first signals and produce a composite signal, a recording head operatively positioned adjacent the surface of the second drum means for recording a signal thereon, and circuit means for selectively connecting each of the reproducing heads to the recording head for recording the composite signal produced by the respective reproducing heads on the second drum means;
correlation head means operatively positioned adjacent to the surface of the second drum means, the correlation head means comprising at least two correlation head segments each for producing a correlation signal representative of the energy level of a predetermined segment of the first signal that is present in the first signal; and, second electrical means comprising a number of recording heads operatively positioned side-by-side adjacent to the surface of the third drum means, the number of recording heads being equal to the number of reproducing heads positioned adjacent to the first drum means, amplitude adjusting circuit means operatively connected to each of the correlation head segments for adjusting the amplitude of the correlation signal from each head segment to produce adjusted correlation signals, adding circuit means operatively interconnecting the amplitude adjusting circuit means to produce a normalized correlation signal, and switching circuit means for selectively connecting the adding circuit means to each of the recording heads operatively positioned adjacent the surface of the third drum means for recording the normalized correlation signals in side-by-side relationship on the surface of the third drum means.

20. A device for compositing, correlating and normalizing a set of first signals recorded in side-by-side relationship on a record sheet adapted to be attached to a drum with a second signal having a predetermined frequency content, the device comprising:

a support frame;
a drive shaft journaled on the support frame;
drive means operatively connected to the drive shaft for driving the drive shaft;
first drum means connected to the drive shaft for receiving the record sheet upon which the first signals are recorded in side-by-side relationship;
second drum means connected to the drive shaft and having a surface upon which a signal can be recorded;
third drum means connected to the drive shaft and having a surface upon which a signal can be recorded,
first electrical means having a reproducing head operatively positioned adjacent the first drum means and a recording head operatively positioned adjacent to the surface of the second drum means, the reproducing head being sufficiently wide to simultaneously scan all the signals of a set of first signals recorded in side-by-side relationship on a record sheet attached to the first drum means and produce a composite signal, and circuit means interconnecting the reproducing head and recording head for recording the composite signal on the surface of the second drum means;
correlation head means operatively positioned adjacent to the surface of the second drum means for producing a correlation signal from the composite signal recorded on the surface of the second drum means;
correlation head means operatively positioned adjacent to the surface of the second drum means, the head means comprising at least two correlation head segments each for producing a correlation signal representative of the energy level of a predetermined segment of the first signal that is present in the first signal; and,
second electrical means having a recording head operatively positioned adjacent to the surface of the third drum means for recording a signal thereon and circuit means operatively connected to the recording head and to each of the correlation head segments for separately adjusting the correlation signal from each of the correlation head segments to produce adjusted correlation signals, for mixing the adjusted correlation signals to produce a normalized correlation signal, and for feeding the normalized correlation signal to the recording head for recordation upon the surface of the third drum means.

21. A device for compositing, correlating and normalizing a set of first signals recorded in side-by-side relationship on a record sheet adapted to be attached to a drum with a second signal having a predetermined frequency content as defined in claim 20 wherein:

the correlation head means is comprised of at least two electrical conductor segments positioned in end-to-end relationship and extending circumferentially around the second drum means, each conductor segment having a configuration approximating the wave shape of a portion of the second signal, and all of the conductor segments taken in conjunction approximating the wave shape of the entire second signal.

22. A device for compositing, correlating and normalizing a set of first signals recorded in side-by-side relationship on a record sheet adapted to be attached to a drum with a second signal having a predetermined frequency content as defined in claim 20 wherein:

the conductor segments taken in conjunction have a configuration approximating the wave shape of a sweep signal starting at one frequency and progressing to another.

23. A device for compositing, correlating and normalizing a set of first signals recorded in side-by-side relationship on a record sheet adapted to be attached to a drum with a second signal having a predetermined frequency content as defined in claim 20 wherein:

the second drum means has a diameter substantially greater than the diameter of the first drum means for increasing the resolution of the correlation signals.

24. A device for compositing, correlating and normalizing a set of first signals recorded in side-by-side relationship on a record sheet adapted to be attached to a drum with a second signal having a predetermined frequency content as defined in claim 20 wherein:

the correlation head means is comprised of a continuous conductor and the segments are formed by a plurality of electrical tapes connected to midpoints of the continuous conductor; and,
the second electrical means is comprised of a plurality of transformers each having a primary winding and a secondary winding, the primary winding of each transformer being connected cross two adjacent electrical taps, a variable resistor operatively connected to the secondary winding of each transformer, and summing circuit means operatively connecting all of the variable resistors to the reproducing heads operatively positioned adjacent to the surface of the third drum means for recording the normalized correlation signal on the third drum means.

25. A device for compositing, correlating and normalizing a set of first signals recorded in side-by-side relationship on a record sheet adapted to be attached to a drum with a second signal having a predetermined frequency content which is also recorded on the record sheet in side-by-side relationship with the set of first signals as defined in claim 20 further characterized by:

third electrical means having a reproducing head operatively positioned adjacent the first drum means and a recording head operatively positioned adjacent the surface of the second drum means for reproducing the second signal for a record sheet positioned on the first drum means and recording the second signal on the surface of the second drum means;
second correlation head means operatively positioned adjacent to the surface of the second drum means for producing a correlation signal from the second signal recorded on the surface of the second drum means; and,
fourth electrical means operatively connected to the second correlation head means and having a recording head operatively positioned adjacent to the third drum means for recording the correlation signal from the second correlation head means on the third drum means as a zero time signal.

26. A device for compositing, correlating and normalizing a set of first signals recorded in side-by-side relationship on a record sheet adapted to be attached to a drum with a second signal having a predetermined frequency content, the record sheet also having a constant frequency timing signal recorded thereon in side-by-side relationship with the set of first signals, the device as defined in claim 25 further characterized by:
   fifth electrical means having a reproducing head operatively positioned adjacent to the first drum means and a recording head operatively positioned adjacent to the third drum means for reproducing the constant frequency timing signal from a record sheet attached to the first drum means and recording the timing signal on the surface of the third drum means.

27. A device for compositing, correlating and normalizing a plurality of sets of first signals recorded in side-by-side relationship on a record sheet adapted to be attached to a drum with a second signal having a predetermined frequency content, each set of first signals comprising a plurality of sequentially recorded seismographic signals or the like, the device comprising:
   a support frame;
   a drive shaft journaled on the support frame;
   drive means operatively connected to the drive shaft for driving the drive shaft;
   first drum means connected to the drive shaft for receiving the record sheet upon which the first signals are recorded in side-by-side relationship;
   second drum means connected to the drive shaft and having a surface upon which a signal can be recorded;
   third drum means connected to the drive shaft and having a surface upon which a signal can be recorded;
   first electrical means having a plurality of reproducing heads operatively positioned in side-by-side relationship adjacent the first drum means, each reproducing head being sufficiently wide to simultaneously scan a set of first signals and produce a composite signal, a recording head operatively positioned adjacent the surface of the second drum means for recording a signal thereon, and circuit means for selectively connecting each of the reproducing heads to the recording head for recording the composite signal produced by the respective reproducing heads on the second drum means;
   correlation head means operatively positioned adjacent to the surface of the second drum means, the correlation head means comprising at least two correlation head segments each for producing a correlation signal representative of the energy level of a predetermined segment of the first signal that is present in the first signal; and,
   second electrical means comprising a number of recording heads operatively positioned side-by-side adjacent to the surface of the third drum means, the number of recording heads being equal to the number of reproducing heads positioned adjacent to the first drum means, amplitude adjusting circuit means operatively connected to each of the correlation head segments for adjusting the amplitude of the correlation signal from each head segment to produce adjusted correlation signals, adding circuit means operatively interconnecting the amplitude adjusting circuit means to produce a normalized correlation signal, and switching circuit means for selectively connecting the adding circuit means to each of the recording heads operatively positioned adjacent the surface of the third drum means for recording the normalized correlation signals in side-by-side relationship on the surface of the third drum means.

28. A method for compiling and processing seismic data comprising the steps of:
   recording a reference signal on a first record sheet;
   reproducing the reference signal and simultaneously inducing a seismic signal in the earth corresponding to the reference signal, detecting the seismic reflection signal from the induced seismic signal and simultaneously recording the seismic reflection signal on the first record sheet;
   moving the first record sheet in synchronism with second and third record sheets while maintaining the record sheets in a predetermined relative relationship;
   reproducing the seismic reflection signal from the first record sheet, recording the seismic reflection signal recorded on the second record sheet, correlating the seismic reflection signal recorded on the second record sheet by a first correlation head to produce a correlation signal;
   recording the correlation signal on the third record sheet; and,
   reproducing the reference signal from the first record sheet and recording the reference signal on the second record sheet, correlating the reference signal recorded on the second drum to produce a zero time correlation signal and recording the zero time correlation signal on the third record sheet.

29. A method for compiling and processing seismic data comprising the steps set forth in claim 28 further characterized by:
   recording an elapsed time signal on the first record sheet simultaneously with the reference signal; and
   reproducing the elapsed time signal from the first record sheet and recording the elapsed time signal on the third record sheet.

30. A method for compiling and processing seismic data comprising the steps set forth in claim 28 wherein:
   the seismic reflection signal recorded on the second record sheet is correlated by moving the record sheet past an elongated conductor having a wave shape approximating the wave shape of the reference signal to generate an electromotive force signal between each adjacent pair of a plurality of preselected points on the conductor means, and the relative amplitudes of the electromotive force signals are adjusted and algebraically summed to produce the correlation signal.

31. A method for compiling and processing seismic data comprising the steps of:
   recording a reference signal on a first record sheet;
   sequentially reproducing the reference signal a plurality of times and simultaneously inducing a seismic signal in the earth each time corresponding to the reference signal;
   detecting the seismic reflection signals from the sequentially induced seismic signals and simultaneously recording the seismic reflection signals on the record sheet each time;
   moving the first record sheet in synchronism with second and third record sheets while maintaining the record sheets in a predetermined relative relationship;
   simultaneously reproducing a plurality of the seismic reflection signals from the first record sheet, compositing the seismic reflection signals, recording the composited seismic reflection signals on the second record sheet, correlating the composited signal recorded on the second record sheet by a first correlation head to produce a correlation signal, normalizing the correlation signal and recording the correlation signal on the third record sheet;
   reproducing the reference sweep signal from the first record sheet and recording the reference sweep signal on the second record sheet; and,
   correlating the reference sweep signal recorded on the second record sheet by a second correlation head disposed in predetermined relationship to the first correlation head to produce a zero time correlation signal and recording the zero time correlation signal on the third record sheet, whereby the seismic data will be compiled, composited, correlated and normalized and the zero starting time will be accurately preserved.

References Cited by the Examiner

UNITED STATES PATENTS

| | | | |
|---|---|---|---|
| 3,047,836 | 7/1962 | Johnson et al. | 340—15.5 |
| 3,065,453 | 11/1962 | Doty | 340—15.5 |
| 3,174,142 | 3/1965 | Mallinckrodt | 340—15.5 |
| 3,185,958 | 5/1965 | Masterson et al. | 340—15.5 |
| 3,198,281 | 8/1965 | Mifsud | 181—.5 |

FOREIGN PATENTS 1,329,739  5/1963  France.

BENJAMIN A. BORCHELT, *Primary Examiner.*

SAMUEL FEINBERG, *Examiner.*

R. M. SKOLNIK, *Assistant Examiner.*